US009690858B1

(12) United States Patent
Diliberto et al.

(10) Patent No.: US 9,690,858 B1
(45) Date of Patent: Jun. 27, 2017

(54) PREDICTING CATEGORIZED COMPLETIONS OF A PARTIAL SEARCH TERM

(71) Applicant: Priceline.com, Inc., Norwalk, CT (US)

(72) Inventors: Michael Diliberto, Ritchfield, CT (US); John Caine, Bridgeport, CT (US); Jonathan Taylor, Ridgefield, CT (US); Michael P. Gonzalez, Valparaiso, IN (US); Jim Jianqiang Chen, Danbury, CT (US); Amit Poddar, Stamford, CT (US)

(73) Assignee: PRICELINE.COM LLC, Norwalk, CT (US)

( * ) Notice: Subject to any disclaimer, the term of this patent is extended or adjusted under 35 U.S.C. 154(b) by 318 days.

(21) Appl. No.: 14/181,498

(22) Filed: Feb. 14, 2014

(51) Int. Cl.
*G06F 17/30* (2006.01)

(52) U.S. Cl.
CPC .. *G06F 17/30867* (2013.01); *G06F 17/30864* (2013.01); *G06F 17/3053* (2013.01); *G06F 17/3064* (2013.01); *G06F 17/3097* (2013.01)

(58) Field of Classification Search
CPC ......... G06F 17/30864; G06F 17/30867; G06F 17/3064; G06F 17/3097; G06F 17/3053; G06Q 10/02; G06Q 50/14
USPC ....... 707/767, 708, 721, 723, 759, 765, 768, 707/771
See application file for complete search history.

(56) References Cited

U.S. PATENT DOCUMENTS

| | | | | |
|---|---|---|---|---|
| 8,332,748 B1* | 12/2012 | Karam | ............. | G06F 17/30672 715/246 |
| 8,473,485 B2* | 6/2013 | Wong | ............... | G06F 17/30867 707/721 |
| 8,631,004 B2* | 1/2014 | Mishne | ............ | G06F 17/30864 707/727 |
| 8,660,849 B2* | 2/2014 | Gruber | ............... | G06F 17/3087 340/988 |
| 9,158,860 B2* | 10/2015 | Markovich | ......... | G06F 17/3097 |
| 9,405,841 B2* | 8/2016 | Amacker | .......... | G06F 17/30873 |
| 2013/0232006 A1* | 9/2013 | Holcomb | .......... | G06F 17/30864 705/14.54 |
| 2013/0325839 A1* | 12/2013 | Goddard | ........... | G06F 17/30867 707/708 |
| 2014/0108445 A1* | 4/2014 | Oztekin | ............. | G06F 17/3097 707/767 |

(Continued)

*Primary Examiner* — Dangelino Gortayo
(74) *Attorney, Agent, or Firm* — Hickman Palermo Becker Bingham LLP

(57) ABSTRACT

In an embodiment, a method comprises receiving, from a client computer, a first request comprising a partial search term for an item, wherein the partial search term comprises one or more characters; selecting a first plurality of predicted completions of the partial search term based, at least in part, on the partial search term, wherein each predicted completion in the first plurality of predicted completions is associated with a category of a set of categories; determining an order of each category in the set of categories; ordering the first plurality of predicted completions based, at least in part, on a position, in the order, of each category that is associated with each predicted completion in the first plurality of predicted completions; sending the first plurality of predicted completions to the client computer.

24 Claims, 10 Drawing Sheets

(56) References Cited

U.S. PATENT DOCUMENTS

2014/0280289 A1* 9/2014 Marantz ............ G06F 17/30392
　　　　　　　　　　　　　　　　　　　　　　707/767
2015/0006632 A1* 1/2015 Tomkins ................ H04L 51/20
　　　　　　　　　　　　　　　　　　　　　　709/204

* cited by examiner

PREDICTING CATEGORIZED COMPLETIONS OF A PARTIAL SEARCH TERM

FIELD OF THE DISCLOSURE

The present disclosure generally relates to searching techniques applicable to predicting completed search terms, and relates more specifically to techniques for predicting categorized completions of a partial search term.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Online applications may offer search engines that produce a result set based upon a search term received in a search box or field. For example, a user, browsing a web page through a browser on a personal computer, may begin to enter a name for a particular item in a search box. As the user begins to type the name of the item, the web page may be updated dynamically with one or more item names that include the entered portion of the particular item. For example, a user looking for a hotel in New York may go to a travel web site and enter "new" into a text field. The web page may be updated to present the user with several suggested searches, such as "New York" or "New Jersey". The suggested searches may help the user to find the item the user is looking for more quickly.

In some cases, the returned suggestions may be confusing to the user. For example, if a user enters "new" and the search suggestions include "New York" and "New Jersey", it may not be clear whether the first search term, "New York", will search for the city of New York, places to visit in New York City, airports in and/or near New York City, or hotels in New York City. Furthermore, to focus the search results on New York, the user may be required to enter extra characters that more closely match the desired results, such as "New Y"; the added keystrokes can become a burden. Thus, more detailed search suggestions may be helpful to the user. For example, if the user selects to search for "New York", then the user may receive results regarding places to visit, airports, and/or hotels in or around New York City and not for New Jersey.

SUMMARY

The appended claims may serve as a summary of the invention.

Figure 1:
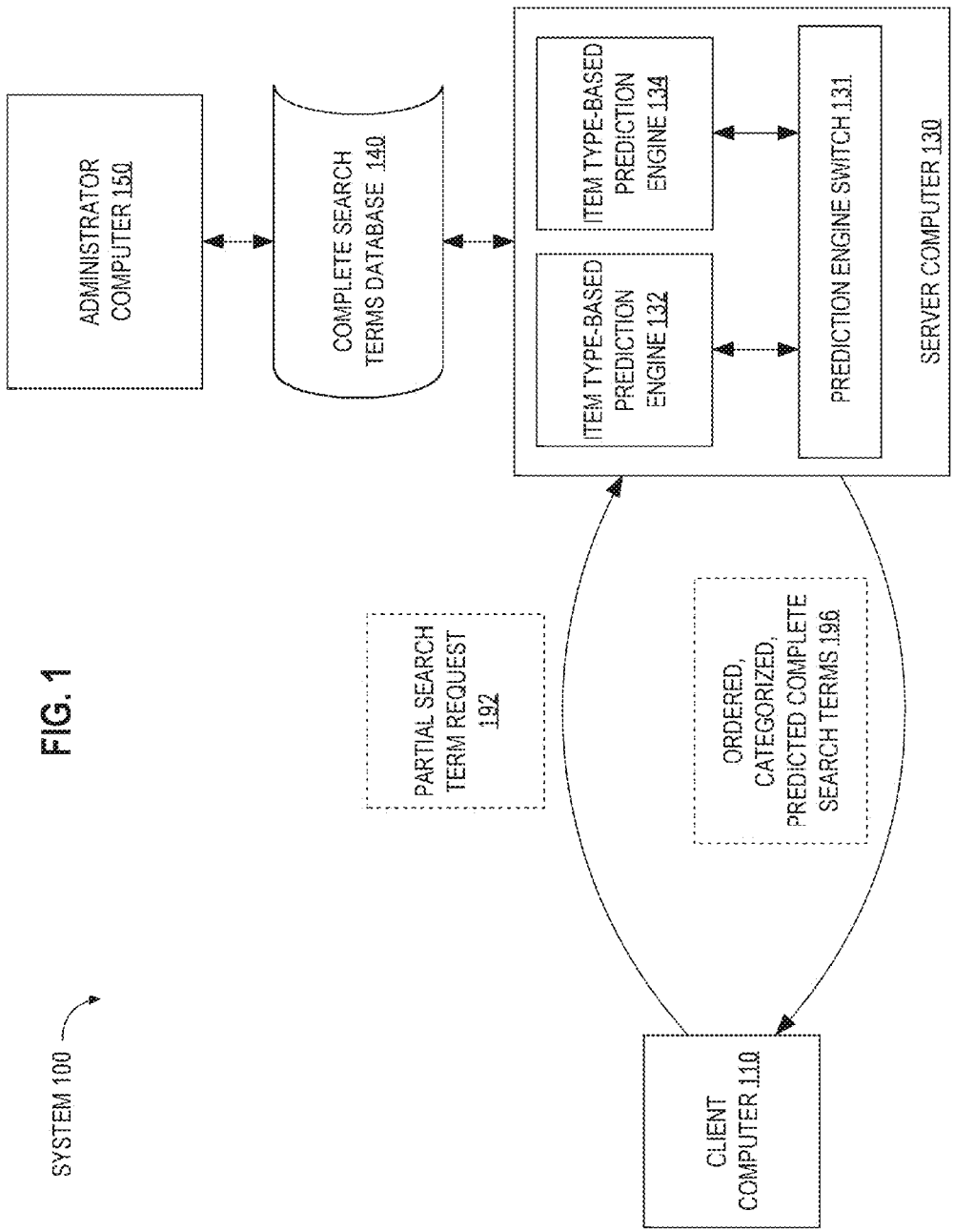
FIG. 1 illustrates a computer system for predicting categorized completions of a partial search term, in an example embodiment.

While each of the drawing figures illustrates a particular embodiment for purposes of illustrating a clear example, other embodiments may omit, add to, reorder, and/or modify any of the elements shown in the figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 Terms
2.0 General Overview
3.0 Example Network Topology
   3.1 Client Computer
   3.2 Server Computer
   3.3 Complete Search Terms Database
   3.4 Administrator Computer
4.0 Process Overview
   4.1 Selecting Complete Search Terms based on a Partial Search Term
      4.1.1 Selecting Complete Search Terms based on an Alias
      4.1.2 Determining Selection Ratios
      4.1.3 Select One or More Predicted Completions based on Selection Ratios
      4.1.4 Including Additional Searches
   4.2 Determining an Order for a Set of Categories
   4.3 Ordering a Plurality of Predicted Completions based on the Order of the Categories
   4.4 Sending the Predicted Completions to the User and Presenting the Results
   4.5 Dynamic Feedback
5.0 Implementation Mechanisms—Hardware Overview
6.0 Other Aspects of Disclosure

1.0 TERMS

In certain embodiments:

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

"Sending and/or receiving data over HTTP" may mean sending and/or receiving data and/or instructions using HyperText Transfer Protocol. Additionally or alternatively, "sending and/or receiving data over HTTP" may mean sending and/or receiving data and/or instructions using a subset of the HTTP, such as secure HTTP ("HTTPS"). Additionally or alternatively, one or more other protocols may be used, such as SPDY and/or WebSocket protocol.

An "application program" or "app" may be any computer program or other software element or module. For example, an app may be a desktop application, mobile application, and/or game console application. Also for example, an app may be a separately distributed module that is executed within a browser.

A "browser" may be one or more computer programs or other software elements stored in electronic digital memory and running on a computer that receives instructions from a server computer, performs one or more of the received instructions, causes to display content, provides a user interface ("UI") to receive user inputs, and/or receives and responds to one or more inputs from a user based on or according to the one or more performed instructions. A browser and/or components of a browser may be implemented into an application. For example, a browser and/or components of a browser may be implemented into a mobile application as part of a web view, and/or web view controller, to send and/or receive data over HTTP and/or other protocol. A user may use a browser to send data to a server computer. The server computer may respond with additional instructions.

A "web browser" may be a browser that sends and/or receives data over HTTP. For example, a web browser may receive instructions comprising HTML, CSS, and/or JavaScript over HTTP.

A "page" or "web page" may be a set of instructions that define one or more objects and/or operations that may be executed concurrently and may be visually displayed together. For example, in response to a request from a client computer, a "home page" may be sent to the client computer. The home page may be a set of instructions that a web server sends to a remote client computer if no parameters are included in the request.

A "web server" or "web server computer" may mean any server computer capable of sending and/or receiving data with a client computer executing a web browser over HTTP. A web server may generate and/or send one or more web pages, portions of a web page, and/or data to be presented as part of a web page.

An "item" may mean any good or service. Additionally or alternatively, an "item" may be any content that may be presented to a user.

To "present data" may mean to visually display data and/or audibly play data.

A "bot" may mean a computer and/or software executed by a computer that automates sending and/or receiving data. For example, a bot may be a web scraper, web crawler, automatic web browser, and/or any other tool designed to submit and/or receive data from one or more web servers. A bot may comprise complex logic designed to respond to data received from one or more web servers.

2.0 GENERAL OVERVIEW

In an embodiment, a method comprises receiving, from a client computer, a first request comprising a partial search term for an item, wherein the partial search term comprises one or more characters; selecting a first plurality of predicted completions of the partial search term based, at least in part, on the partial search term, wherein each predicted completion in the first plurality of predicted completions is associated with a category of a set of categories; determining an order of each category in the set of categories; ordering the first plurality of predicted completions based, at least in part, on a position, in the order, of each category that is associated with each predicted completion in the first plurality of predicted completions; sending the first plurality of predicted completions to the client computer.

In an embodiment, the method comprises determining a selection ratio for the partial search term and each predicted completion in a set of predicted completions based, at least in part, on a first count of instances in which the predicted completion is included in the first plurality of predicted completions that have been sent in response to previous requests comprising the partial search term, and a second count of instances in which the predicted completion is selected after receiving the first plurality of predicted completions; selecting one or more predicted completions from the set of predicted completions based, at least in part, on the selection ratio of each predicted completion in the one or more predicted completions; including, in the first plurality of predicted completions, the one or more predicted completions that are selected.

In an embodiment, the method comprises determining a threshold value based, at least in part, on the selection ratio of each predicted completion of the one or more predicted completions; determining the selection ratio of a particular predicted completion in the one or more predicted completions is greater than the threshold value; ordering the particular predicted completion to be first in the first plurality of predicted completions and ordering each remaining predicted completion in the first plurality of predicted completions based, at least in part, on the order.

In an embodiment, the method comprises maintaining an alias mapping that maps one or more partial search terms to one or more aliases; selecting an alias from the alias mapping based on the partial search term; selecting the first plurality of predicted completions based, at least in part, on the alias.

In an embodiment, the method comprises determining a first selection ratio for the partial search term, a first item type, and each predicted completion in a set of predicted completions based, at least in part, on a first count of instances in which the predicted completion is included in the first plurality of predicted completions sent in response to previous requests comprising the partial search term and the first item type, and a second count of instances in which the predicted completion is selected by a user after receiving the first plurality of predicted completions; receiving the first request, wherein the first request specifies the first item type; selecting one or more first predicted completions from the set of predicted completions to include in the first plurality of predicted completions based, at least in part, on the first selection ratio of each predicted completion in the one or more first predicted completions; determining a second selection ratio for the partial search term, a second item type, and each predicted completion in the set of predicted completions based, at least in part, on a third count of instances in which the predicted completion is included in a second plurality of predicted completions sent in response to previous requests comprising the partial search term and the second item type, and a fourth count of instances in which the predicted completion is selected by a user after receiving the second plurality of predicted completions; receiving a second request, wherein the second request specifies the second item type; selecting one or more second predicted completions from the set of predicted completions to include in the second plurality of predicted completions based, at least in part, on the second selection ratio of each predicted completion in the one or more second predicted completions.

The broad techniques described herein may be implemented in specific ways in particular industries or for particular applications or data types, and may offer numerous benefits and advances over prior techniques in various contexts. In one example, using an embodiment, a user looking for a hotel in New York may retrieve a web page from a travel web site, through a browser, and enter "new" into a text field. The web page may be updated to present the user with several suggestions for searches related to specific categories, such as "Places to visit in New York", "Hotels in New York", and "Rental car services in New York City". The suggestions may be grouped and ordered by a category associated with each suggestion, such as "Hotel", "Airport", "Car", and/or "Place". The ordered, categorized suggestions may help the user to find the item the user is looking for more quickly. Additionally, if a user selects a result associated within a particular category, then the results from that search may be focused on what the user is actually looking for. Thus, in the example above, if the user selects "Hotels in New York", then the user may be presented with results related to hotels in or near New York City. The user need not be presented with airports, places to visit, or places to rent cars in or near New York City.

3.0 EXAMPLE NETWORK TOPOLOGY

FIG. 1 illustrates a computer system for predicting categorized completions of a partial search term, in an example embodiment. System 100 comprises client computer 110, server computer 130, complete search terms database 140, and administrator computer 150 coupled using a LAN, or distributed across a plurality of interconnected networks or internetworks. While client computer 110, server computer 130, complete search terms database 140, and administrator computer 150 are illustrated as if running on a separate, remote computer from each other, one or more of the components listed above may be part of and/or executed on the same computer. Elements within each of the client computer 110, server computer 130, complete search terms database 140, and administrator computer 150, and their functions, are described individually in other sections herein.

For purposes of illustrating a clear example, FIG. 1 shows a single client computer 110, but in practical embodiments there may be any number of clients and embodiments are specifically contemplated for use with thousands or millions of clients. Each of the administrator computer 150, server computer 130 and database 140 may be implemented using one or more computers, processors, cores, clusters, or instances in conventional or cloud computing environments.

3.1 CLIENT COMPUTER

Client computer 110 may be a computer executing an application program used by one or more users to search for items through server computer 130. Accordingly, client computer 110 and server computer 130 are communicatively coupled. However, for purposes of illustrating clear examples herein, assume client computer 110 is a computer executing a web browser, which may cause to display one or more web pages and/or interfaces discussed herein, receive input from a user, communicate with server computer 130 over HTTP, and present one or more predicted complete search terms. In an embodiment, one or more of the methods discussed herein may be performed on client computer 110. For example, client computer 110 may order categories and/or completions in categories.

Figure 2:
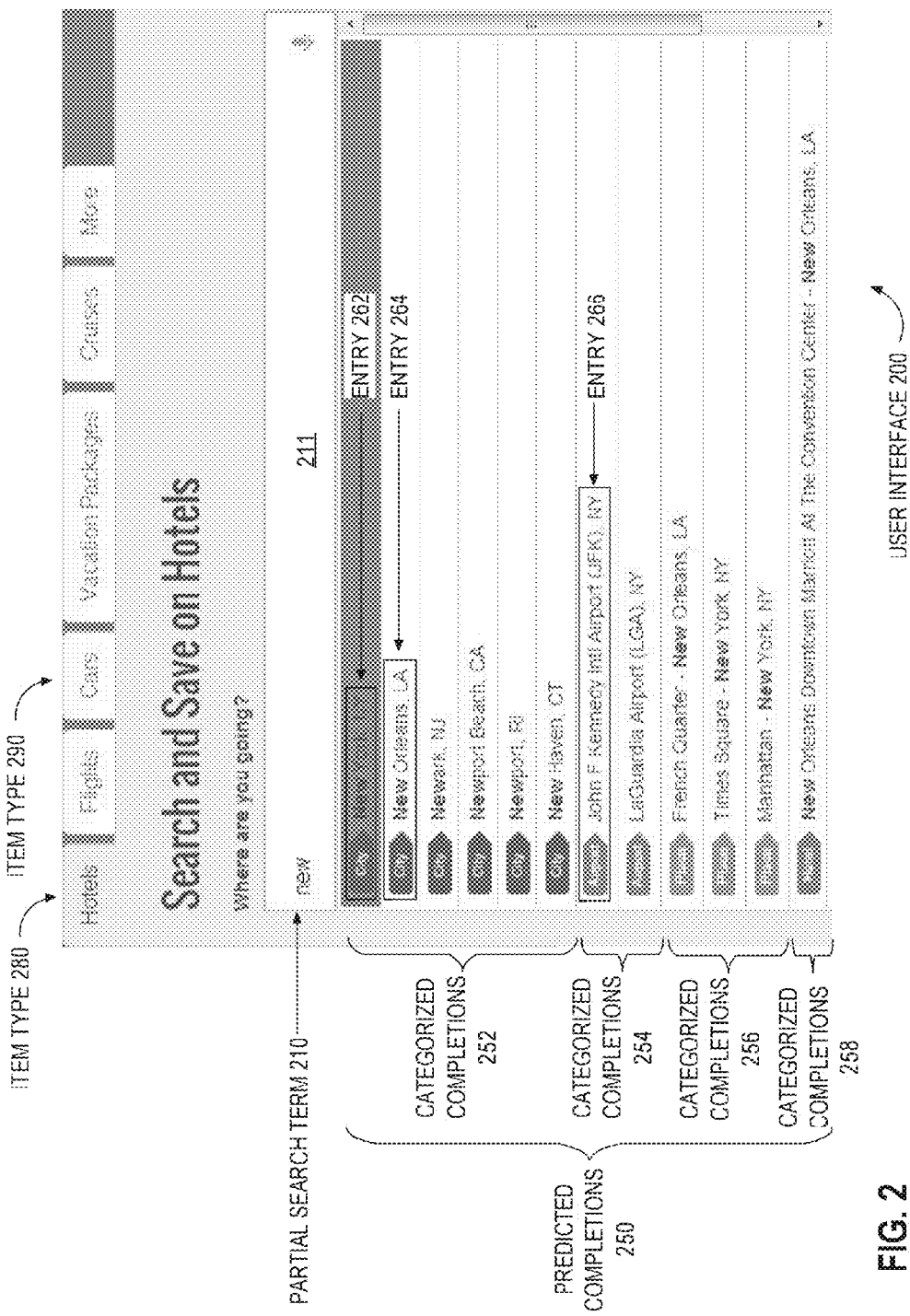
FIG. 2 illustrates an example graphical user interface that may be presented by client computer, in an example embodiment.

FIG. 2 illustrates an example graphical user interface that may be presented by a client computer, in an example embodiment. In the example of FIG. 2, user interface 200 may be generated at server computer 130 and provided to client computer 110 for rendering in a browser at the client computer or as part of a locally installed application program or "app" on the client computer. In an embodiment, GUI 200 of FIG. 2 forms a portion of the complete user interface of a travel booking service with which computer users may browse, select, and book reservations, tickets or bookings for products and/or services such as hotels, flights, rental cars, vacation packages, and the like. However, the general techniques described herein may be implemented in the context of other kinds of apps, services, and industries and hotel booking is described here solely to illustrate a clear example.

In FIG. 2, the GUI 200 may comprise a plurality of graphical tabs that are associated with item types, and as an example item type 280, "Hotels", is selected, and a partial search term 210, "new", has been entered in a search box 211. Client computer 110 may send partial search term 210 and/or item type 280 to server computer 130. In response, client computer 110 may receive predicted completions 250, which include a list of complete search terms that are predicted to be the user's intended complete search term.

In an embodiment, the predicted completions 250 are grouped by category, and each category is presented in a particular order: categorized completions 252, categorized completions 254, categorized completions 256, and then categorized completions 258. Additionally, a category name may be presented. In the illustrated embodiment, the category names are "city", "airport", "place", and "hotel". Methods for ordering categories are further discussed in detail herein. Logic implemented in server computer 130, or in an app on client computer 110, may perform the grouping, ordering and presentation.

The predicted completions may be ordered within each category. For example, entry 262 indicating "New York, N.Y." may be predicted to be the user's likely completed search term. Thus, "New York, N.Y.," is presented first in predicted completions 250. Also for example, "John F Kennedy Intl Airport (JFK), NY", entry 266, may be predicted to be the user's mostly likely completed search term within categorized completions 254. Accordingly, entry 266 is presented first in categorized completions 254. Methods for ordering predicted completions, and ordering predicted completions within each category, are described in other sections herein.

Figure 3:
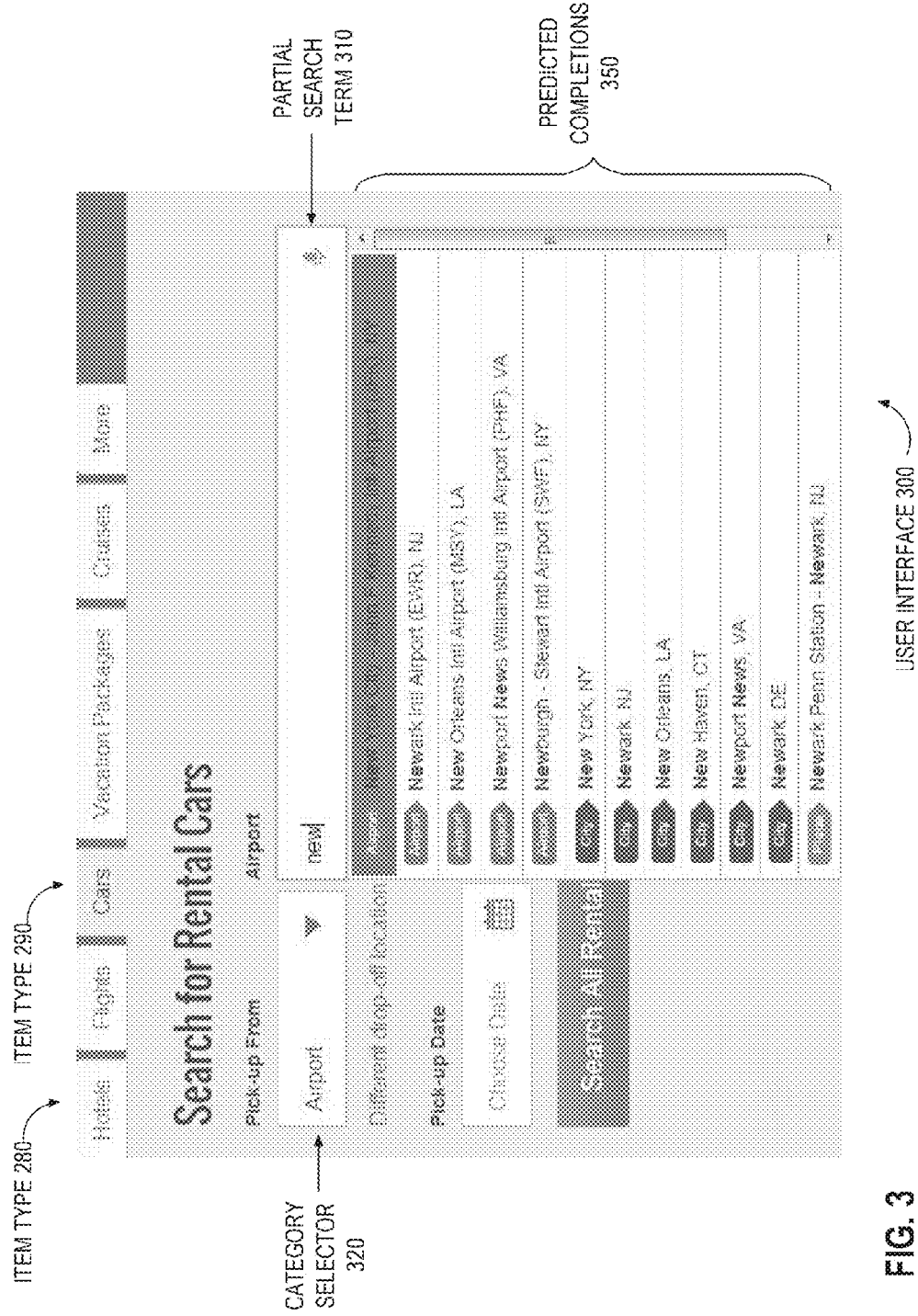
FIG. 3 depicts an example graphical user interface that may be presented on the display of the client computer using one or more of the methods discussed herein, in an example embodiment.

FIG. 3 depicts an example graphical user interface that may be presented on the display of the client computer using one or more of the methods discussed herein, in an example embodiment. In the example of FIG. 3, item type 290, "Cars", is selected, and a partial search term 310, "new", has been entered using client computer 110. Client computer 110 may send partial search term 210 and/or item type 280 to server computer 130. In response, client computer 110 receives predicted completions 350, which includes a list of complete search terms that are predicted to be the user's intended complete search term.

However, even though partial search term 310 and partial search term 210 are the same, the presentation of predicted completions 350 is different than predicted completions 250: the categories are ordered differently, the results within each category are ordered differently, and some results in predicted completions 350 are not in predicted completions 250 and vice versa. Predicted completions 350 and predicted completions 250 may be different because client computer 110 may provide an interface for the user to select the most important category: category selector 320.

In an embodiment, the categories used to organize predicted completions, and the order of the categories, may differ for different item types based upon observation of user behavior in completing transactions for different item types. For example, observation of booking data for actual transactions or reservations may indicate that users who search for hotels tend to book after selecting a city as a search term rather than an airport, whereas booking data for rental car transactions may indicate that users tend to book based upon using an airport code as a search term. The particular categories, and ordering of the categories, that are used for different item types may be hard-coded into application logic at the server or client, or stored in tables in the database, or maintained in other data repositories, in each case with some form of mapping to or association with the item types. Predicted completions 350 and predicted completions 250 may be different for many additional reasons discussed in detail herein.

3.2 SERVER COMPUTER

Server computer 130 may be a computer that is configured to receive partial search terms from client computer 190 and responds with one or more predicted complete search terms. Server computer 100 may use item type-based prediction engine 132 and/or item type-based prediction engine 134 to generate the predicted complete search terms according to the methods and processes discuss in detail herein. Prediction engine switch 131 may determine which prediction engine is used for predicting complete search terms for each partial search term. Engines 132, 134 may be integrated into a set of server application programs that implement a substantive service, such as the hotel booking service described in the example diagrams.

Server computer 130 may use item type-based prediction engine 132 to predict complete search terms related to a particular type of item, such as hotels. Server computer 130 may use item type-based prediction engine 134 to predict complete search terms related to a different, particular type of item, such as rental cars. In an embodiment, server computer 130 may use one search term prediction engine to predict complete search terms for more than one type of item.

Item type-based prediction engine 132 and item type-based prediction engine 134 are illustrated as if executed on the same computer. However, item type-based prediction engine 132 and/or item type-based prediction engine 134 may be executed by one or more remote computers distributed across one or more interconnected networks communicatively coupled to server computer 130 and complete search terms database 140. Furthermore, item type-based prediction engine 132 and item type-based prediction engine 134 may be part of, and/or executed on, the same computer as any other computer and/or component illustrated in FIG. 1.

3.3 COMPLETE SEARCH TERMS DATABASE

Complete search terms database 140 may store one or more complete search terms and/or data related to complete search terms. For example, complete search terms stored in complete search terms database 140 may be associated with a type of item, a partial search term, alias, and/or other data discussed herein. Server computer 130, administrator computer 150, and/or any of modules of server computer 130 and/or administrator computer 150, may search, retrieve, and/or store one or more complete search terms, or data related to complete search terms, in complete search terms database 140.

For purposes of illustrating clear examples, the data discussed herein may be stored in complete search terms database 140. Additionally or alternatively, data stored in complete search terms database 140 may be stored in one or more other databases, systems, computers and/or services.

In an embodiment, each database in a plurality of databases stores completed search terms for a single category, and item type-based prediction engine 132 may query each database for results for each category. Each database may be configured, and/or queried for complete search terms, differently and/or independently. For example, each database may have a different set of selection ratios and/or aliases (which are discussed in detail herein) associated with a particular partial search term and/or one or more complete search terms.

3.4 ADMINISTRATOR COMPUTER

Administrator computer 150 may be a computer used by an administrator to add, remove from, and/or modify any data stored on complete search terms database 140. For example, an administrator may determine that a particular complete search term should be associated with a particular alias. The administrator, through administrator computer 150, may add the particular alias to complete search terms database 140. The administrator, through administrator computer 150, may associate the particular alias to a particular complete search term in complete search terms database 140.

4.0 PROCESS OVERVIEW

Figure 4:
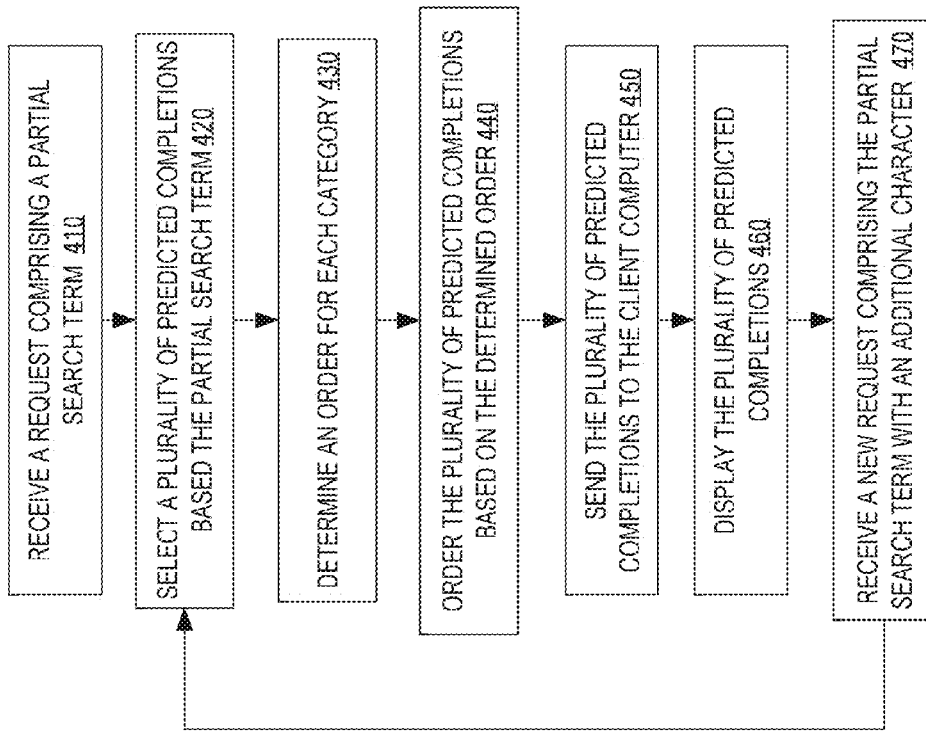
FIG. 4 illustrates a process for receiving a partial search term and returning a set of ordered, predicted complete search terms, in an example embodiment.

FIG. 4 illustrates a process for receiving a partial search term and returning a set of ordered, predicted complete search terms, in an example embodiment. For purposes of illustrating a clear example, FIG. 4 may be described with reference to FIG. 1, FIG. 2, and FIG. 3, but using the particular arrangements illustrated in FIG. 1, FIG. 2, and/or FIG. 3 is not required in other embodiments.

In step 410, a server computer receives a partial search term from a client computer. For example, a user using client computer 110 may enter partial search term 210, "new", in a field. In response, client computer 110 may send partial search term request 192 to server computer 130. Partial search term request 192 may comprise partial search term 210 and a selected item type: item type 280, "Hotels". For purposes of illustrating a clear example, assume that item type-based prediction engine 132 is configured to predict complete search terms related to item type 280, and that item type-based prediction engine 134 is configured to predict complete search terms related to item type 290. Accordingly, prediction engine switch 131 may forward partial search term request 192 to item type-based prediction engine 132.

4.1 SELECTING COMPLETE SEARCH TERMS BASED ON A PARTIAL SEARCH TERM

Figure 5:
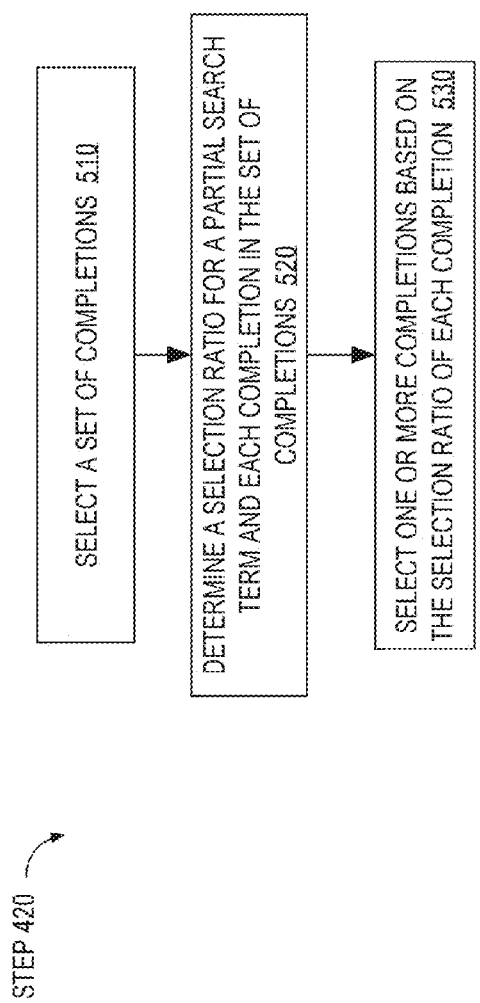
FIG. 5 illustrates a process for selecting a plurality of predicted completions based on a partial search term, in an example embodiment.

In step 420, a prediction engine selects a plurality of predicted completions based on the partial search term. FIG. 5 illustrates a process for selecting a plurality of predicted completions based on a partial search term, in an example embodiment. In step 510, a prediction engine selects a set of completions. For example, item type-based prediction engine 132 may query complete search terms database 140 for complete search terms that include, and/or are based on, the partial search term received in step 410. Additionally, either item type-based prediction engine 132 and/or complete search terms database 140 may group the selected complete search terms by the category each completed search term belongs to.

One or more preprocessing methods for querying and/or searching may be used. For example, either item type-based prediction engine 132 and/or complete search terms database 140 may apply an autocorrect dictionary to a partial search term. As a specific example, the partial search term "nww" may be autocorrected to "new". Engine 132, engine 134, server 130, complete search terms database 140, a remote service, and/or a remote computer may include one or more autocorrect dictionaries that may be applied to a partial and/or complete search term.

4.1.1 SELECTING COMPLETE SEARCH TERMS BASED ON AN ALIAS

Figure 6:
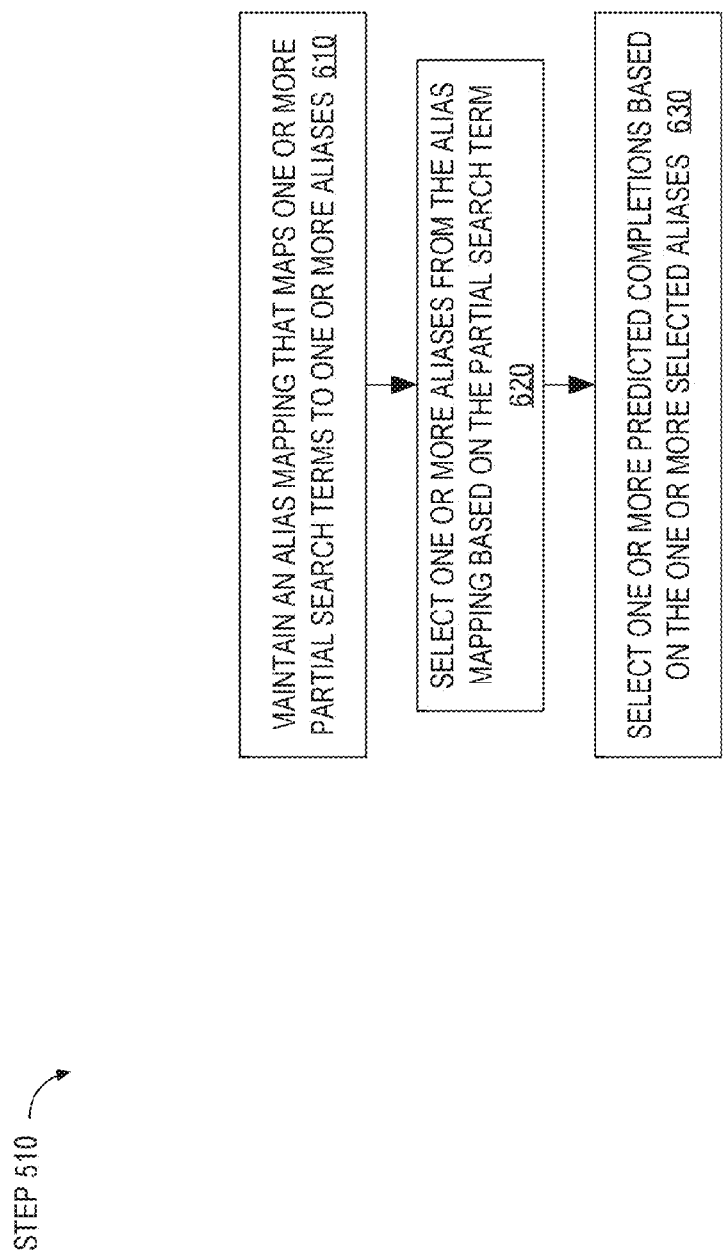
FIG. 6 illustrates a process for selecting a plurality of predicted completions based on a partial search term and an alias mapping, in an example embodiment.

FIG. 6 illustrates a process for selecting a plurality of predicted completions based on a partial search term and an alias mapping, in an example embodiment. In step 610, a complete search terms database maintains an alias mapping that maps one or more partial search terms to one or more aliases. For example, item type-based prediction engine 132 may log partial search term, "dis", in complete search terms database 140. Item type-based prediction engine 132 may also log a different partial and/or complete search term made soon after the initially logged search term by the same user and/or through the same computer and/or Internet protocol address. For purposes of illustrating a clear example, assume the different partial and/or complete search term logged is "Orlando". An administrator, using administrator computer 150, may scan the logs in complete search terms database 140 and add a mapping between the partial search term, "dis", and the complete search term, "Orlando", as the alias. Additionally or alternatively, an administrator, through administrator computer 150, may make other mappings based on logs or other information, such as "dis" and "Anaheim", or "dis" and "Disneyland".

An administrator may review partial and/or complete search terms using administrator computer 150 and create one or more new aliases and/or autocorrect entries. For example, an administrator using administrator computer 150 may receive a report of one or more popular partial and/or complete search terms that do not return results from complete search terms database 140, ordered by popularity. The administrator may add one or more of the partial and/or complete search terms as aliases for one or more items and/or one or more complete search terms. Additionally or alternatively, the administrator may update an autocorrect dictionary, through administrator computer 150, such that one or more popular partial and/or complete search terms may be autocorrected to a different partial and/or complete search term.

In step 620, a prediction engine selects one or more aliases from the alias mapping based on the partial search term. For purposes of illustrating a clear example, assume item type-based predicting engine 132 receives "dis" as the partial search term. Item type-based prediction engine 132 may query complete search terms database 140 for one or more aliases: "Orlando", "Anaheim", and "Disneyland".

Figure 7:
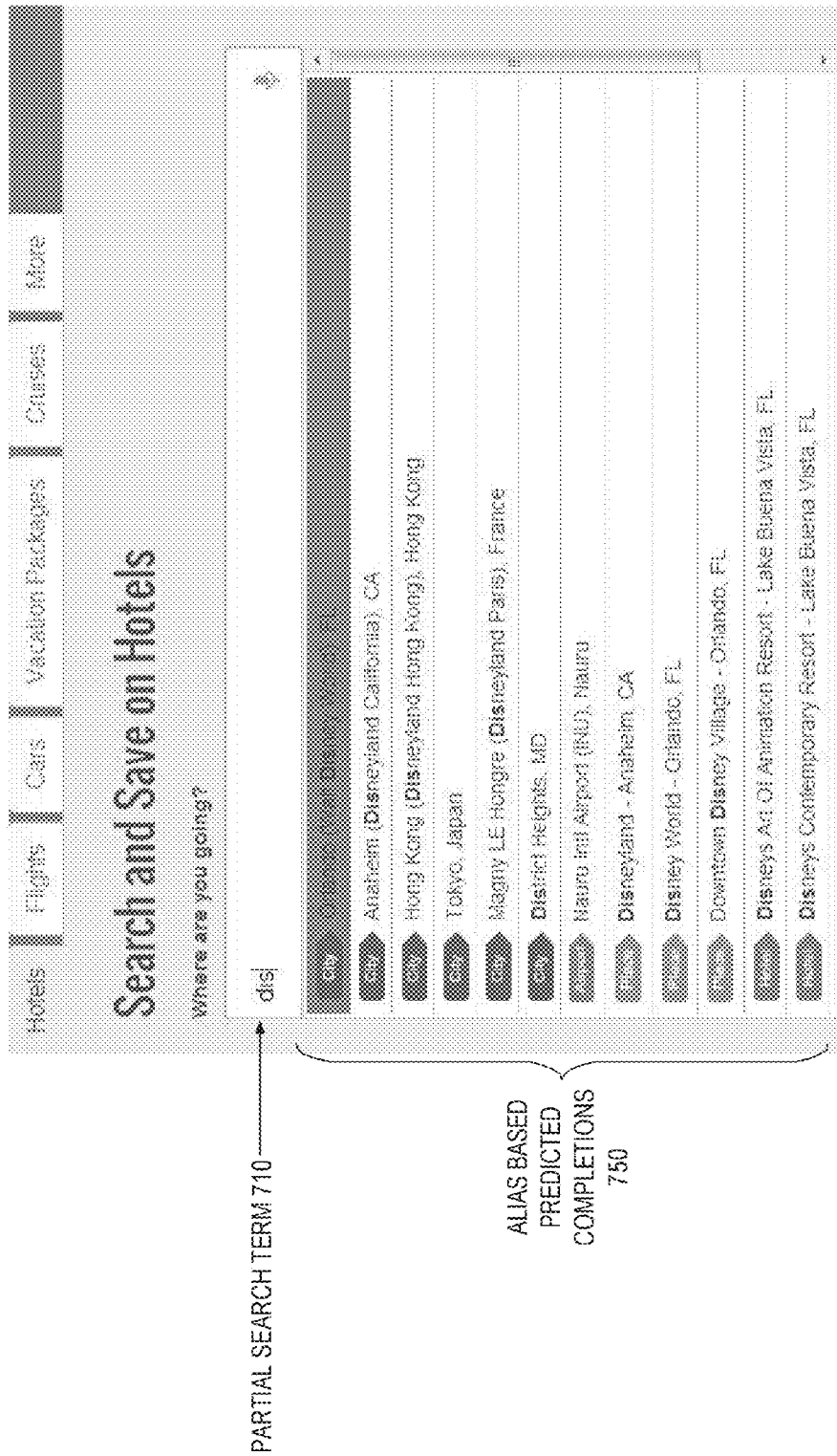
FIG. 7 illustrates an example graphical user interface that may be presented using one or more of the methods discussed herein, in an example embodiment.

In step 630, the prediction engine selects one or more predicted completions based on the one or more selected aliases. FIG. 7 illustrates an example graphical user interface 700 that may be presented on the display of client computer 110 using one or more of the methods discussed herein, in an example embodiment. In FIG. 7, partial search term 710, "dis", has been entered using client computer 110. In response, client computer 110 may receive and display alias-based predicted completions 750, which include a list of complete search terms that are predicted to be the user's intended complete search term based, at least in part, on one or more alias: "Orlando", "Anaheim", and "Disneyland". One or more of the methods discussed herein may be used to select and/or order the predicted completions 750.

4.1.2 DETERMINING SELECTION RATIOS

Returning now to FIG. 5, in step 520, the prediction engine determines a selection ratio for the partial search term and each completion in a set of completions. A selection ratio may indicate how likely a particular complete search term may be selected for a partial search term. For example, a selection ratio for a particular complete search term and a particular partial search term may be based, at least in part, on the number of times the particular complete search term was included in a set of predicted completions for the particular partial search term. Additionally or alternatively, the selection ratio may be based, at least in part, on the number of times the particular complete search term was presented in a set of predicted completions for the particular partial search term. Additionally or alternatively, the selection ratio may be based, at least in part, on the number of times the particular complete search term was selected by a user when the particular complete search term was included in a set of predicted completions for the particular partial search term.

The selection ratio, and/or factors for determining the selection ratio, for a particular complete search term and a partial search term pair may be pre-computed. For example, when item type-based prediction engine 132 includes a particular complete search term in a set of predicted completions for the particular partial search term, then the prediction engine may update a total count associated with both the particular complete search term and the particular partial search term. Item type-based prediction engine 132 may store the total count in complete search terms database 140. Additionally or alternatively, the prediction engine may store and/or update a selection ratio associated with the particular complete search term and the particular partial search term, based on the total count, in complete search terms database 140. Repetitious data coming from the same Internet protocol address may be filtered to prevent data from bots and/or malicious users.

A selection ratio need not be based merely on a total count and a selected count. For example, a selection ratio and/or the data used to determine the selection ratio may be weighted based on time and/or any other factor(s). Additionally or alternatively, one or more statistical models and/or processes may be used to determine a selection ratio.

In response to a particular request for predicted search terms, a selection ratio may be boosted based on one or more factors. For example, in response to a particular request from a user, if the location of the user is known, then a boosted selection ratio for a particular complete search term may be used if the complete search term represents a product that is within a particular distance to the user. The boosted selection ratio may be based on the original selection ratio, a constant value, the particular distance to the user, and/or one or more other factors. The location of a user may be stored in complete search terms database 140. Additionally or alternatively, the location of a user may be estimated and/or determined based on the IP address included in a request from the user, the user's home and/or billing address, and/or the location of one or more of the user's mobile devices.

4.1.3 SELECT ONE OR MORE PREDICTED COMPLETIONS BASED ON SELECTION RATIOS

In step 530, the prediction engine selects one or more completions based, at least in part, on the selection ratio of selected completions. For example, the prediction engine may determine a threshold value based on the maximum, minimum, mean, median, variance, standard deviation, and/or any other method and/or model. Item type-based prediction engine 132 may select any completion equal to or greater than the threshold value. Additionally or alternatively, item type-based prediction engine 132 may select a threshold value for each category. For example, if the item type is "Hotel", then completions in the "airport" category may have to have selection ratios that meet a higher threshold value than completion ratios for completions in the "Hotel" and/or "Place" categories. Additionally or alternatively, item type-based prediction engine 132 may select the top most completions from each category, such that the results include the same number of completions from each category.

Some methods for determining a selection ratio may require a particular amount of data to be associated with a corresponding completion, such as a minimum number of times the corresponding completed search term has been included in predicted completions 250. Thus, item type-based prediction engine 132 may select a completion that is not associated with enough data to determine a selection ratio according to a statistical model and/or administrator.

4.1.4 INCLUDING ADDITIONAL SEARCHES

In an embodiment, prior searches and/or bookings made by a user may be included in the one or more predicted completions. For example, if a user previously booked a stay at a particular hotel in New York City, then item type-based prediction engine 132 may select the completion that represents the particular hotel. Accordingly, the completion that represents the particular hotel may be included in predicted completions 250. Additionally or alternatively, the completion that represents the particular hotel may be listed in a different portion of the user interface. For example, the completion that represents the particular hotel may be in a separate dropdown menu from the completions in predicted completions 250.

4.2 DETERMINING AN ORDER FOR A SET OF CATEGORIES

Returning now to FIG. 4, in step 430, the prediction engine determines an order in which to place each category. For example, item type-based prediction engine 132 may have a mapping stored locally and/or in complete search terms database 140 that maps item types with category orders. For example, a mapping may associate an item type "Hotels" with the following category order: "City", "Airport", "Place", and "Hotel". Thus, in the embodiment illustrated in FIG. 2, if partial search term 210 is associated with item type 280, "Hotels", then the categories are ordered by "City", "Airport", "Place", and "Hotel".

Additionally or alternatively, a user may select the category order. For example, in FIG. 3, a user may set category selector 320 to designate the highest priority category: "Airport". The remaining categories may be ordered based on a mapping or some other method discussed herein.

Figure 8:
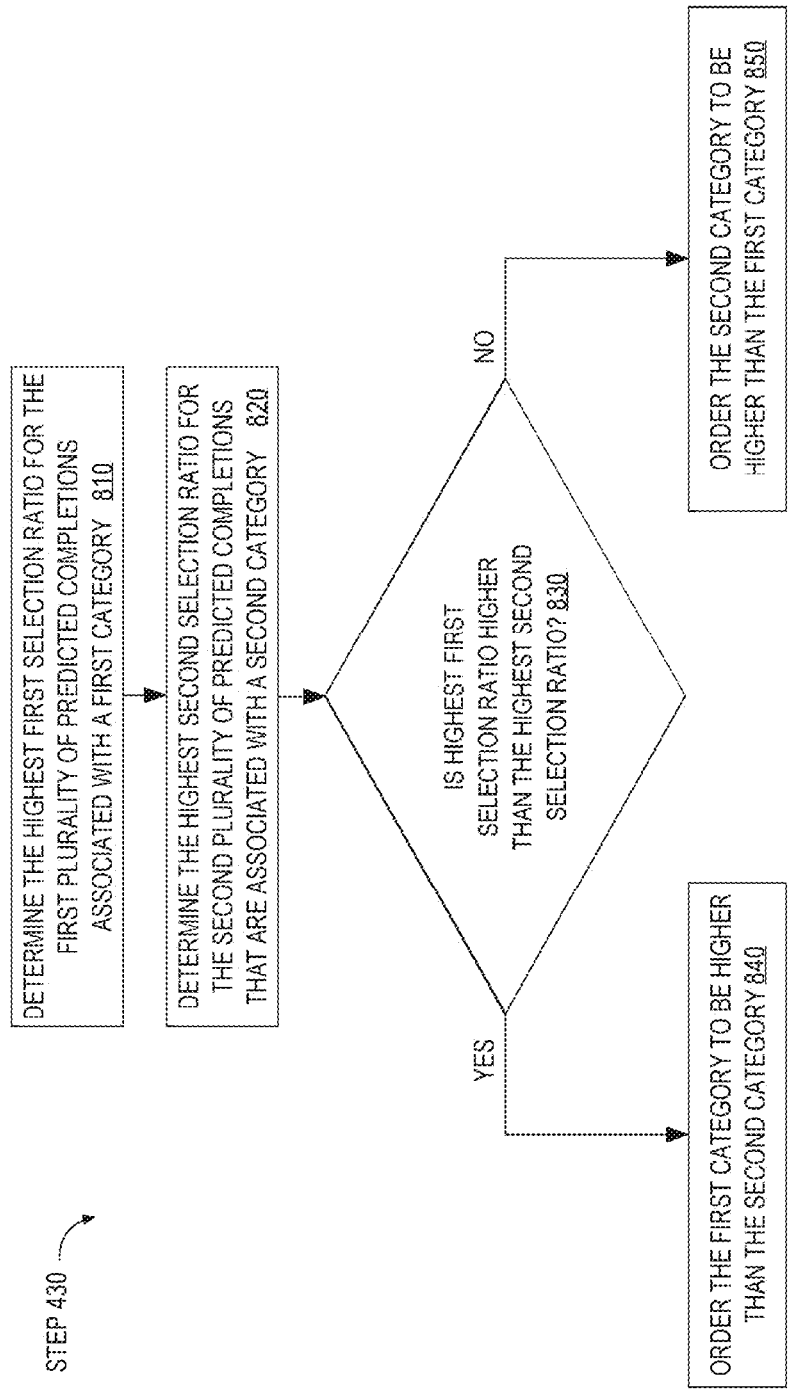
FIG. 8 illustrates a process for determining a category order, in an example embodiment.

FIG. 8 illustrates a process for determining a category order, in an example embodiment. For purposes of illustrating a clear example, assume that the entries illustrated in predicted completions 250 are the set of predictions returned from step 420, entry 262 has a selection ratio of X, entry 264 has a selection ratio Y, and entry 266 has a selection ratio Z. Further assume that X is greater than any other selection ratio in the set of predicted completions, and Z is the second greatest selection ratio of predicted completions. Thus, X is greater than Z, and Z is greater than Y.

In step 810, the prediction engine determines the highest first selection ratio for the first plurality of predicted completions associated with a first category. For example, item type-based prediction engine 132 may compare selection ratios for the entries in categorized completions 252 to determine the highest selection ratio, which in this case is X.

In step 820, the prediction engine determines the highest second selection ratio for the second plurality of predicted completions associated with a second category. For example, item type-based prediction engine 132 may compare selection ratios for the entries in categorized completions 254 to determine the highest selection ratio, which in this case is Z.

In step 830, the prediction engine determines whether the highest first ratio is higher than the highest second ratio. If so, then control may proceed to step 840, and item type-based prediction engine 132 may order the first category to be higher than the second category. Otherwise, control may proceed to step 850, and item type-based prediction engine 132 may order the second category to be higher than the first category. For example, item type-based prediction engine 132 may compare X and Z and determine that X is greater than Z. Accordingly, control may proceed to step 840 and orders the first category, categorized completions 252, higher than the second category, categorized completions 254.

Additionally or alternatively, item type-based prediction engine 132 may use other methods and/or models, such as mean, median, and/or variance, to determine how the categories may be ordered. For example, item type-based prediction engine 132 may order the categories based on the median selection ratio for each category.

4.3 ORDERING A PLURALITY OF PREDICTED COMPLETIONS BASED ON THE ORDER OF THE CATEGORIES

Returning now to FIG. 4, in step 440, the prediction engine orders the plurality of predicted completions based, at least in part, on the determined order. For example, item type-based prediction engine 132 may order the predicted completions within each category by selection ratio, and order each category accordingly to the order determined in step 430. In other words, the predicted completions are first grouped by categories, and then all predicted completions are ordered based upon the previously determined order of categories. As a result, in the examples of FIG. 2, FIG. 3, all "city" predicted completions appear together, as do all "airport" predicted completions, and whether the "city" predicted completions together appear before or after the "airport" predicted completions is driven by the category order that was determined at step 430.

Additionally or alternatively, prediction engine 132 may order the predicted completions within each category based on one or more other factors. For example, in response to a partial search term for hotels, if a first city has more hotels than a second city, prediction engine 132 may order the first city higher than the second city in the city category. Also for example, if the user making the request has previously selected a first predicted completion, but not a second predicted completion, then prediction engine 132 may order the first predicted completion higher than a second predicted completion within the same category. Also for example, if the location of the user making the request is known, and the first predicted completion, or the product the predicted completion represents, is associated with a location that is closer to the user than a second predicted completion, then prediction engine 132 may order the first predicted completion higher than the second predicted completion within the same category. Also for example, to determine the order of airports in the airports category, if a first airport has fewer outbound canceled flights than a second airport, then prediction engine 132 may order the predicted completion that represents the first airport higher than the predicted completion that represents the second airport.

Figure 9:
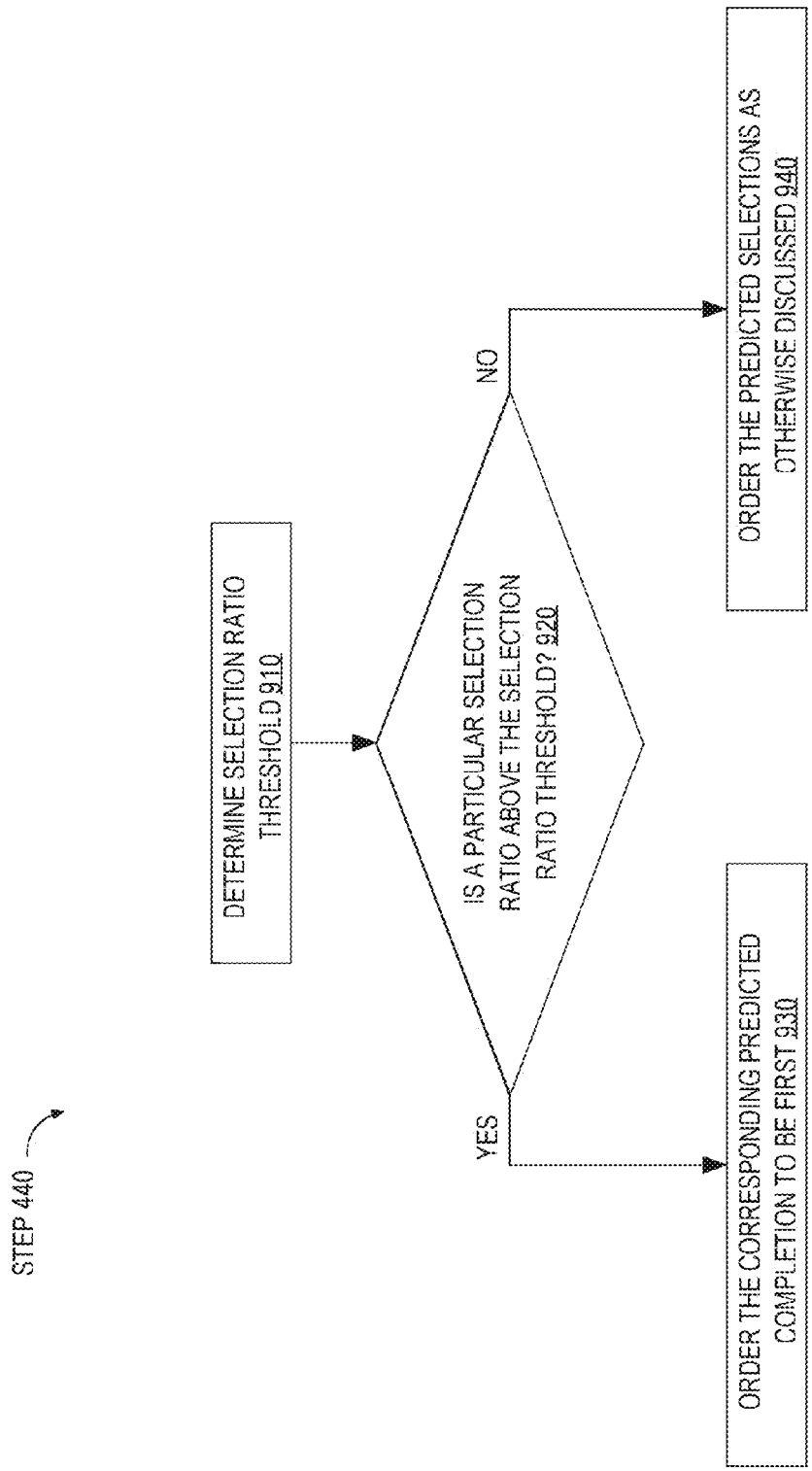
FIG. 9 illustrates a process for ordering a predicted completion independently from the category the completion is assigned to, in an example embodiment.

Additionally or alternatively, a predicted completion may be ordered independently from the category the completion is assigned to. FIG. 9 illustrates a process for ordering a predicted completion independently from the category the completion is assigned to, in an example embodiment. In step 910, a prediction engine determines a selection ratio threshold value. For example, item type-based prediction engine 132 may determine the mean and standard deviation of the plurality of predicted completions found in step 420. Item type-based prediction engine 132 may set a selection ratio threshold value to be two standard deviations greater than the mean of the plurality of predicted completions. Additionally or alternatively, the selection ratio threshold value may be based on a constant value, other statistical model, and/or any other method.

In step 920, the prediction engine determines whether there is a selection ratio that is above the selection ratio threshold value. If so, then control may proceed to step 930; otherwise control may proceed to step 940 and order the predicted completions as otherwise discussed herein. For example, if the prediction engine determines that a particular selection ratio is higher than the selection ratio threshold value, then the prediction engine may order the corresponding predicted completion above the predicted completions that do not. Even though the category associated with the predicted completion is not the highest ordered category, the predicted completion may be ordered to be the first predicted completion. If more than one predicted completion has a selection ratio that is equal to or greater than the threshold value, then the predicted completions with selection ratios equal to or greater than the threshold value may be ordered by selection ratio, such that the predicted selection with the highest selection ratio is ordered first. Additionally or alternatively, the predicted completion with the highest selection ratio that is equal to or greater than the threshold value is ordered first. The rest of the predicted completions may be ordered within their respective categories.

As a result, the predicted completions within a particular category may be sorted or ordered based upon popularity in view of past searches or bookings, based on other selection or statistical techniques as described, or even alphabetically.

4.4 SENDING THE PREDICTED COMPLETIONS TO THE USER AND PRESENTING THE RESULTS

Returning now to FIG. 4, in step 450, the prediction engine sends the ordered plurality of predicted completions to the client computer. For example, item type-based prediction engine 132 may send ordered, categorized, predicted complete search terms 196 to client computer 110 to be presented. Ordered, categorized, predicted complete search terms 196 may comprise data that includes the selected predicted completion from step 440. The data may associate each selected, predicted completion with an order and/or category. The data may associate each category with an order. Additionally or alternatively, the format of the data may indicate the order of each predicted completion, the category associated with each predicted completion, the order of each predicted completion within the category, and/or the order of the categories. Additionally or alternatively, the data may include the selection ratios, and/or data to determine selection ratios, for each of the predicted completions.

In step 460, the client computer displays the plurality of predicted completions. For example, client computer 110 may display a dropdown list, with ordered predicted completions, that is visually connected to the partial search term, or the container that holds the partial search term, similar to FIG. 2, FIG. 3, and/or FIG. 7. As discussed herein, item type-based prediction engine 132 may update complete search terms database 140 to indicate which completions were selected and sent to client computer 110. Additionally or alternatively, when client computer 110 presents one or more of the predicted completions, client computer 110 sends data to server computer 130 indicating that the one or more predicted completions were presented to the user. In response, item type-based prediction engine 132 may update complete search terms database 140 to indicate which predicted completions were actually presented to the user. The selection ratio associated with the one or more predicted completions may be recalculated as discussed herein.

In step 470, the client computer sends the partial search term to the server computer with one or more additional characters. For example, instead of selecting one of the predicted complete search terms in step 460, the user may input one or more additional characters through client computer 110. In response, client computer 110 sends the data discussed in step 410 to server computer 130 with the one or more additional characters. The process may repeat at step 410.

Alternatively, a user using client computer 110 may select one of the predicted completions. In response, client computer 110 may send a request to server computer 130 with the selected predicted completion. Item type-based prediction engine 132 may update complete search terms database 140 to indicate that the predicted completion was selected. The selection ratio associated with of the selected predicted completion may be recalculated as discussed herein. Items associated with the selected, predicted, categorized completion may be sent to client computer 110 to be presented to the user.

4.5 DYNAMIC FEEDBACK

Item type-based prediction engine 132 may store data or feedback in complete search terms database 140. For example, item type-based prediction engine 132 may store data in complete search terms database 140 indicating that a user submitted a request with a partial search term, received a set of predicted completions, and selected a particular predicted completion from the set of predicted completions.

The data may be used to update one or more selection ratios automatically. For example, after complete search terms database 140 receives the data indicated in the previous example, then item type-based prediction engine 132 may calculate and/or update the selection ratio stored in complete search terms database 140 for each predicted completion in the set of predicted completions returned. Accordingly, the selection ratio for the selected predicted completion may be increased, while the selection ratio for each predicted completion that was not selected may be reduced. The calculated selection ratios may be stored in complete search terms database 140.

Additionally or alternatively, based on a collection of feedback data stored in complete search terms database 140, item type-based prediction engine 132 may calculate and/or update selection ratios for predicted completions periodically, such as daily and/or hourly. Additionally or alternatively, item type-based prediction engine 132 may calculate and/or update selection ratios for predicted completions after a particular amount of feedback data is accumulated.

Item type-based prediction engine 132 may store other data or feedback in complete search terms database 140. For example, item type-based prediction engine 132 may store data in complete search terms database 140 indicating that a user submitted a request with a first partial search term, did not select any predicted completion, submitted a new request with a different partial search term, and selected a particular predicted completion.

The data may be used to generate a new alias automatically. For example, if complete search terms database 140 accumulates the data indicated in the previous example numerous times, then item type-based prediction engine 132 may store the first partial search term as an alias for the particular selected predicted completion in complete search terms database 140. Additionally or alternatively, if complete search terms database 140 accumulates the data indicated in the previous example numerous times, then item type-based prediction engine 132 may store a new mapping in an autocorrect dictionary mapping the first partial search term to the second partial search term in complete search terms database 140.

Additionally or alternatively, based on a collection of feedback data stored in complete search terms database 140, item type-based prediction engine 132 may automatically create new aliases and/or mappings in an autocorrect dictionary periodically, such as daily and/or hourly. Additionally or alternatively, item type-based prediction engine 132 may automatically create new aliases and/or mappings in an autocorrect dictionary after a particular amount of feedback data is accumulated.

Based on the collection of feedback data stored in complete search terms database 140, item type-based prediction engine 132 may notify an administrator. For example, if the feedback data indicates that users frequently submit a second partial search term "new", after submitting a first partial search term "nww", then item type-based prediction engine 132 may notify an administrator. In response, the administrator may review the feedback data. Additionally or alternatively, the administrator may create one or more new aliases and/or mappings in an autocorrect dictionary and/or store the new aliases and/or mappings in complete search terms database 140.

5.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
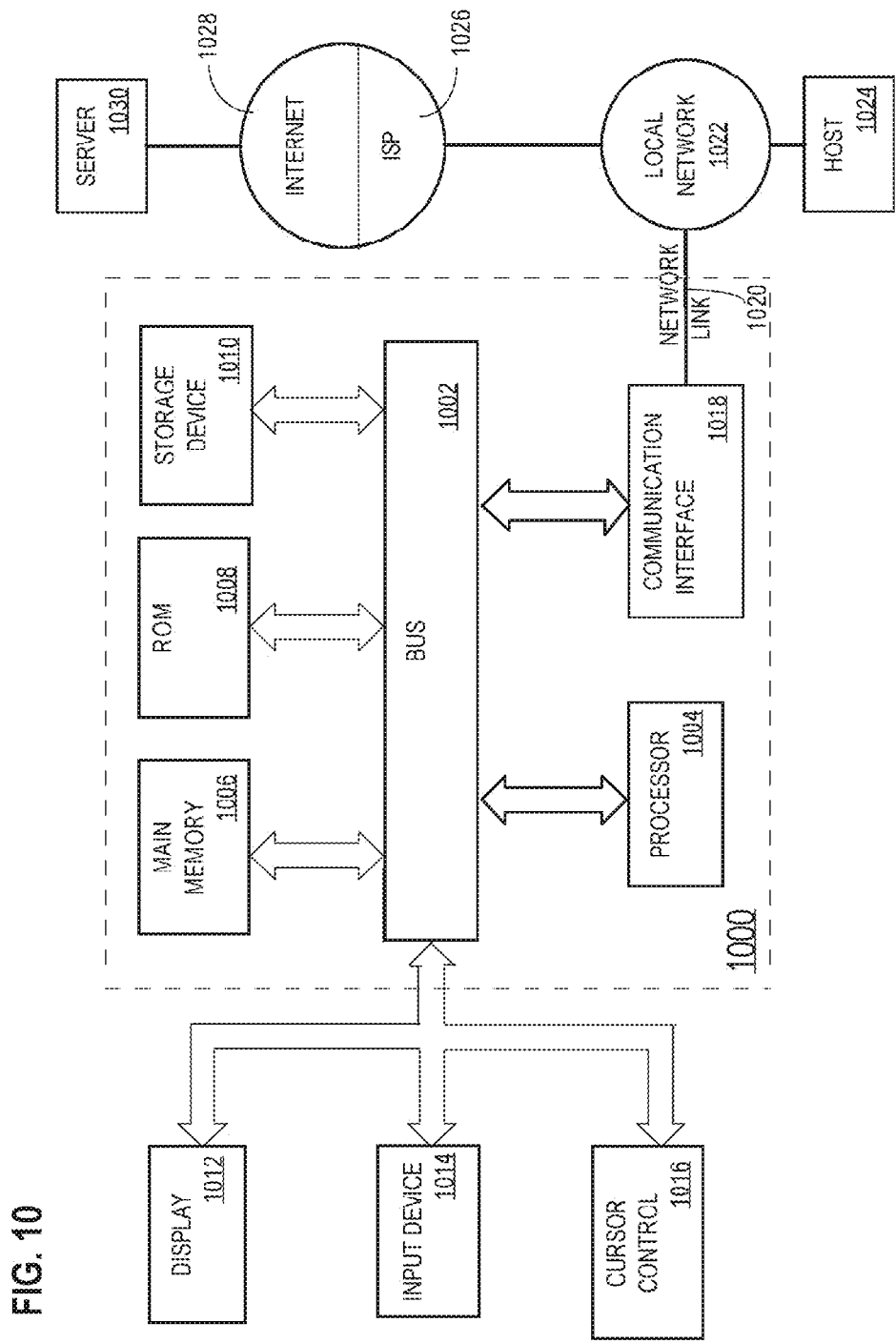
FIG. 10 illustrates a computer system upon which an embodiment may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

6.0 OTHER ASPECTS OF DISCLOSURE

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, from a client computer, a first request comprising a partial search term for an item, wherein the partial search term comprises one or more characters;
   selecting a first plurality of predicted completions of the partial search term based, at least in part, on the partial search term, wherein each predicted completion in the first plurality of predicted completions is associated with a category of a set of categories;

wherein the first plurality of predicted completions comprises: a first set of categorized completions associated with a first category among the set of categories, and a second set of categorized completions associated with a second category among the set of categories;

determining a highest first selection ratio for the first set of categorized completions associated with the first category wherein the highest first selection ratio is greater than a first threshold value based, at least in part, on a selection ratio for the partial search term and the first set of categorized completions;

determining a highest second selection ratio for the second set of categorized completions associated with the second category wherein the highest second selection ratio is greater than a second threshold value based, at least in part, on a selection ratio for the partial search term and the second set of categorized completions;

ranking the highest first selection ratio and the highest second selection ratio;

determining an order of each category in the set of categories based, in part, on ranking the highest first selection ratio and the highest second selection ratio;

ordering the first plurality of predicted completions based, at least in part, on a position, in the order, of each category that is associated with each predicted completion in the first plurality of predicted completions;

sending, to the client computer, the first plurality of predicted completions and data identifying the first set of categorized completions from the first plurality of predicted completions and the second set of categorized completions from the first plurality of predicted completions;

wherein the method is performed by one or more computers.

2. The method of claim 1 comprising:

collecting a first set of feedback data indicating one or more predicted completions were sent to one or more client computers in response to receiving the partial search term;

collecting a second set of feedback data indicating how many times each predicted selection of the one or more predicted completions that were sent to the one or more client computers in response to receiving the partial search term were selected;

calculating, periodically, a selection ratio for the partial search term and each predicted completion in a set of predicted completions based, at least in part, on the first set of feedback data and the second set of feedback data.

3. The method of claim 1 comprising:

determining a selection ratio for the partial search term and each predicted completion in a set of predicted completions based, at least in part, on a first count of instances in which the predicted completion is included in the first plurality of predicted completions that have been sent in response to previous requests comprising the partial search term, and a second count of instances in which the predicted completion is selected after receiving the first plurality of predicted completions;

selecting one or more predicted completions from the set of predicted completions based, at least in part, on the selection ratio of each predicted completion in the one or more predicted completions;

including, in the first plurality of predicted completions, the one or more predicted completions that are selected.

4. The method of claim 3 comprising:

ordering the particular predicted completion to be first in the first plurality of predicted completions and ordering each remaining predicted completion in the first plurality of predicted completions based, at least in part, on the order.

5. The method of claim 3 comprising for each predicted completion from the one or more predicted completions, determining the selection ratio is greater than or equal to a particular threshold value, and in response, adding the predicted completion to the first plurality of predicted completions.

6. The method of claim 3 comprising:

determining a highest first selection ratio for the first plurality of predicted completions that are associated with a first category of the set of categories;

determining a highest second selection ratio for the first plurality of predicted completions that are associated with a second category of the set of categories;

determining the highest first selection ratio is higher than the highest second selection ratio;

ordering the first category to be higher in the order than the second category.

7. The method of claim 1, wherein the first request specifies an item type of a plurality of item types, and the method comprising determining the order based on the item type.

8. The method of claim 1 comprising:

maintaining an alias mapping that maps one or more partial search terms to one or more aliases;

selecting an alias from the alias mapping based on the partial search term;

selecting the first plurality of predicted completions based, at least in part, on the alias.

9. The method of claim 1 comprising:

maintaining a first alias mapping that maps one or more partial search terms to one or more first aliases;

maintaining a second alias mapping that maps the one or more partial search terms to one or more second aliases;

receiving the first request, wherein the first request specifies a first item type;

selecting the first alias mapping based on the first item type;

selecting a first alias from the first alias mapping based on the partial search term;

selecting the first plurality of predicted completions based, at least in part, on the first alias;

receiving a second request comprising the partial search term, wherein the second request specifies a second item type;

selecting the second alias mapping based on the second item type;

selecting a second alias from the second alias mapping based on the partial search term, wherein the first alias is different than the second alias;

selecting a second plurality of predicted completions based, at least in part, on the second alias.

10. The method of claim 1 comprising:

determining a first selection ratio for the partial search term, a first item type, and each predicted completion in a set of predicted completions based, at least in part, on a first count of instances in which the predicted completion is included in the first plurality of predicted completions sent in response to previous requests comprising the partial search term and the first item type, and a second count of instances in which the predicted completion is selected by a user after receiving the first plurality of predicted completions;

receiving the first request, wherein the first request specifies the first item type;

selecting one or more first predicted completions from the set of predicted completions to include in the first plurality of predicted completions based, at least in part, on the first selection ratio of each predicted completion in the one or more first predicted completions;

determining a second selection ratio for the partial search term, a second item type, and each predicted completion in the set of predicted completions based, at least in part, on a third count of instances in which the predicted completion is included in a second plurality of predicted completions sent in response to previous requests comprising the partial search term and the second item type, and a fourth count of instances in which the predicted completion is selected by a user after receiving the second plurality of predicted completions;

receiving a second request, wherein the second request specifies the second item type;

selecting one or more second predicted completions from the set of predicted completions to include in the second plurality of predicted completions based, at least in part, on the second selection ratio of each predicted completion in the one or more second predicted completions.

11. The method of claim 1 comprising:

receiving, on the client computer, the first plurality of predicted completions;

causing displaying of at least a subset of the first plurality of predicted completions on a display.

12. The method of claim 1 comprising causing to present, on a display, a user interface with the first plurality of predicted completions, wherein the user interface identifies which predicted completions of the first plurality of predicted completions are in the first set of categorized completions and which predicted completions of the first plurality of predicted completions are in the second set of categorized completions.

13. A system comprising:

a processor;

a memory;

a database;

a prediction module configured to:

receive, from a client computer, a first request comprising a partial search term for an item, wherein the partial search term comprises one or more characters;

select, from the database, a first plurality of predicted completions of the partial search term based, at least in part, on the partial search term, wherein each predicted completion in the first plurality of predicted completions is associated with a category of a set of categories;

wherein the first plurality of predicted completions comprises: a first set of categorized completions associated with a first category among the set of categories, and a second set of categorized completions associated with a second category among the set of categories;

determine a highest first selection ratio for the first set of categorized completions associated with the first category wherein the highest first selection ratio is greater than a first threshold value based, at least in part, on a selection ratio for the partial search term and the first set of categorized completions;

determine a highest second selection ratio for the second set of categorized completions associated with the second category wherein the highest second selection ratio is greater than a second threshold value based, at least in part, on a selection ratio for the partial search term and the second set of categorized completions;

rank the highest first selection ratio and the highest second selection ratio;

determine an order of each category in the set of categories based, in part, on ranking the highest first selection ratio and the highest second selection ratio;

order the first plurality of predicted completions based, at least in part, on a position, in the order, of each category that is associated with each predicted completion in the first plurality of predicted completions;

send, to the client computer, the first plurality of predicted completions and data identify the first set of categorized completions from the first plurality of predicted completions and the second set of categorized completions from the first plurality of predicted completions.

14. The system of claim 13, wherein the prediction module is configured to:

store, in the database, a first set of feedback data indicating one or more predicted completions were sent to one or more client computers in response to receiving the partial search term;

store, in the database, a second set of feedback data indicating how many times each predicted selection of the one or more predicted completions that were sent to the one or more client computers in response to receiving the partial search term were selected;

calculate, periodically, a selection ratio for the partial search term and each predicted completion in a set of predicted completions based, at least in part, on the first set of feedback data and the second set of feedback data.

15. The system of claim 13, wherein the prediction module is configured to:

determine a selection ratio for the partial search term and each predicted completion in a set of predicted completions based, at least in part, on a first count of instances in which the predicted completion is included in the first plurality of predicted completions that have been sent in response to previous requests comprising the partial search term, and a second count of instances in which the predicted completion is selected after receiving the first plurality of predicted completions;

select one or more predicted completions from the set of predicted completions based, at least in part, on the selection ratio of each predicted completion in the one or more predicted completions;

include, in the first plurality of predicted completions, the one or more predicted completions that are selected.

16. The system of claim 15, wherein the prediction module is configured to:

order the particular predicted completion to be first in the first plurality of predicted completions and order each remaining predicted completion in the first plurality of predicted completions based, at least in part, on the order.

17. The system of claim 15, wherein the prediction module is configured to, for each predicted completion from the one or more predicted completions, determine the selection ratio is greater than or equal to a particular threshold value, and in response, add the predicted completion to the first plurality of predicted completions.

18. The system of claim 15, wherein the prediction module is configured to:
   determine a highest first selection ratio for the first plurality of predicted completions that are associated with a first category of the set of categories;
   determine a highest second selection ratio for the first plurality of predicted completions that are associated with a second category of the set of categories;
   determine the highest first selection ratio is higher than the highest second selection ratio;
   order the first category to be higher in the order than the second category.

19. The system of claim 13, wherein the first request specifies an item type of a plurality of item types, and the prediction module is configured to determine the order based on the item type.

20. The system of claim 13, wherein:
   the database is configured to maintain an alias mapping that maps one or more partial search terms to one or more aliases;
   the prediction module is configured to:
   select an alias from the alias mapping based on the partial search term;
   select the first plurality of predicted completions based, at least in part, on the alias.

21. The system of claim 13, wherein:
   the database is configured to:
   maintain a first alias mapping that maps one or more partial search terms to one or more first aliases;
   maintain a second alias mapping that maps the one or more partial search terms to one or more second aliases;
   the prediction module is configured to:
   receive the first request, wherein the first request specifies a first item type;
   select the first alias mapping based on the first item type;
   select a first alias from the first alias mapping based on the partial search term;
   select the first plurality of predicted completions based, at least in part, on the first alias;
   receive a second request comprising the partial search term, wherein the second request specifies a second item type;
   select the second alias mapping based on the second item type;
   select a second alias from the second alias mapping based on the partial search term, wherein the first alias is different than the second alias;
   select a second plurality of predicted completions based, at least in part, on the second alias.

22. The system of claim 13, wherein the prediction module is configured to:
   determine a first selection ratio for the partial search term, a first item type, and each predicted completion in a set of predicted completions based, at least in part, on a first count of instances in which the predicted completion is included in the first plurality of predicted completions sent in response to previous requests comprising the partial search term and the first item type, and a second count of instances in which the predicted completion is selected by a user after receiving the first plurality of predicted completions;
   receive the first request, wherein the first request specifies the first item type;
   select one or more first predicted completions from the set of predicted completions to include in the first plurality of predicted completions based, at least in part, on the first selection ratio of each predicted completion in the one or more first predicted completions;
   determine a second selection ratio for the partial search term, a second item type, and each predicted completion in the set of predicted completions based, at least in part, on a third count of instances in which the predicted completion is included in a second plurality of predicted completions sent in response to previous requests comprising the partial search term and the second item type, and a fourth count of instances in which the predicted completion is selected by a user after receiving the second plurality of predicted completions;
   receive a second request, wherein the second request specifies the second item type;
   select one or more second predicted completions from the set of predicted completions to include in the second plurality of predicted completions based, at least in part, on the second selection ratio of each predicted completion in the one or more second predicted completions.

23. The system of claim 13, wherein the prediction module is configured to:
   receive, on the client computer, the first plurality of predicted completions;
   cause display of at least a subset of the first plurality of predicted completions on a display.

24. The system of claim 13, wherein the prediction module is configured to cause to present, on a display, a user interface with the first plurality of predicted completions, wherein the user interface identifies which predicted completions of the first plurality of predicted completions are in the first set of categorized completions and which predicted completions of the first plurality of predicted completions are in the second set of categorized completions.

* * * * *